UNITED STATES PATENT OFFICE.

ANTON CHRISTIAN BOHRE, DECEASED, BY KATHARINA CHARLOTTE BOHRE, EXECUTRIX, OF BERGEN, NORWAY.

PROCESS FOR THE MANUFACTURE OF FERTILIZERS.

1,354,719.     Specification of Letters Patent.     Patented Oct. 5, 1920.

No Drawing.    Application filed August 13, 1919. Serial No. 317,142.

*To all whom it may concern:*

Be it known that I, KATHARINA CHARLOTTE BOHRE, a subject of the King of Norway, residing at Bergen, Norway, executrix of ANTON CHRISTIAN BOHRE, deceased, declare that the said ANTON CHRISTIAN BOHRE did invent certain new and useful Improvements in Processes for the Manufacture of Fertilizers; and I do hereby declare the following to be a full, clear, and exact description of the invention, such as will enable others skilled in the art to which it appertains to make and use the same.

This invention relates to fertilizers containing both phosphoric acid and nitrogen compounds.

In order to convert the phosphates which occur in nature into a form suitable for use in agriculture it has been necessary to subject the phosphate to a treatment with acids in a liquid condition. This procedure (the superphosphate manufacture) is bound to very indefinite working conditions, which have to be ascertained by experiments for each individual natural phosphate and which must be accurately followed. This necessity is avoided in a few processes of less importance, according to which however heating to higher temperatures must be resorted to. In any case it has been necessary to subject the phosphate to decomposition by chemical reagents. In order to produce fertilizers containing both phosphoric acid and nitrogen compounds, nitric acid has been made use of as a decomposition agent. Such a process is described for instance in the Norwegian Patent No. 27860.

According to the present invention a fertilizer which supplies the soil with phosphoric acid in a soluble phosphate as well as with nitrogen is obtained by simple means and without the use of such chemicals which increase the weight of the product as well as its cost of production.

This fertilizer is produced by reacting upon the insoluble phosphates with urea nitrate and kindred substances.

The invention is based upon the observation that the urea salts and kindred substances possess the property of reacting upon the tricalcium phosphate and of rendering it soluble. It has also been discovered that the moisture of the soil is sufficient to bring about the reaction between the substances in question.

In accordance with this invention the fertilizer is produced by mixing the natural phosphate with a urea salt or other kindred substance. The substances may be mixed with one another in a dry condition and the mixture applied as such, the reactions between the substances then taking place to the greater part after having been distributed in the soil. The mixture of the substances may also be prepared by mixing the substances in a moist condition and subsequently drying the mixture or the prepared dry mixture may be moistened to bring about the reaction between the constituents whereupon the mixture is prepared for sale by being dried and ground. A substance which may be used with advantage for the purpose of the present invention is the urea nitrate which is produced when cyanamid or cyanamid of lime is reacted upon with nitric acid. Thus the nitrate of urea is an easily obtainable technical product, which can be produced in great quantities. In the presence of moisture the urea nitrate in the reaction product will react upon the tricalcium phosphate.

*Examples.*

I.

1000 kg. of "Gafsa-phosphate" containing 57 per cent. of $Ca_3P_2O_8$ was finely divided and thereupon intimately mixed with 1600 kg. of urea-nitrate.

The fertilizer produced in this manner showed the following analysis.

21 per cent. of nitrogen,
10 per cent. total phosphoric acid $(P_2O_5)$,
9.9 per cent. water-soluble phosphoric acid.

Thus about 99 per cent. of the phosphoric acid was soluble in water.

II.

1000 kg. of "Florida hard rock" containing 69.6 per cent. $Ca_3P_2O_8$ was finely ground and then mixed with 2400 kg. of urea nitrate. On analysis the following figure was found.

24 per cent. of nitrogen,
9.4 per cent. total phosphoric acid, 9.0 per cent. water-soluble phosphoric acid.

It will be seen that in this instance 96 per cent. of the phosphoric acid has been converted into a water-soluble condition.

III.

1000 kg. of apatite containing 89 per cent. $Ca_3P_2O_8$ was finely ground and mixed with 2400 kg. urea nitrate.

On analysis the product was found to contain:

24 per cent. of nitrogen,
12 per cent. total phosphoric acid,
11.3 per cent. water soluble phosphoric acid.

Thus about 94 per cent. of the phosphoric acid content had been converted into a water-soluble form.

Claims:

1. Process for the manufacture of fertilizers that contains nitrogen and soluble phosphates which comprises reacting upon a substance containing insoluble phosphate with a substance containing a urea radical.

2. Process for the manufacture of fertilizers containing both nitrogen and soluble phosphate which consists in reacting upon an insoluble phosphate with urea nitrate.

3. Process for the manufacture of fertilizers containing both nitrogen and phosphoric acid which consists in reacting upon an insoluble phosphate with the substance obtained by reacting upon cyanamid with nitric acid.

4. A fertilizer comprising a substance containing insoluble phosphate and a substance containing a urea radical which are capable of reacting to form soluble phosphate under fertilizing conditions.

5. A fertilizer comprising insoluble phosphate and urea nitrate capable of reacting under fertilizing conditions to form soluble phosphate.

6. A fertilizer comprising insoluble phosphate and a reaction product of a cyanamid and nitric acid, which will react to form soluble phosphate with moisture in the soil.

In testimony that I claim the foregoing as his invention, I have signed my name in presence of two subscribing witnesses.

KATHARINA CHARLOTTE BOHRE,
*Executrix of the estate of Anton Christian Bohre, deceased.*

Witnesses:
AND. YACOBSEN.
A. VOGELSANG.